United States Patent
Berger

[11] 4,099,701
[45] Jul. 11, 1978

[54] SOLENOID-CONTROLLED DIAPHRAGM VALVES

[76] Inventor: Leopold Benjamin Berger, 151 B. Dereh Hayam, Haifa, Israel

[21] Appl. No.: 666,398

[22] Filed: Mar. 12, 1976

[30] Foreign Application Priority Data
Mar. 18, 1975 [IL] Israel .................................. 46857

[51] Int. Cl.² ................... F16K 31/40; F16K 31/385
[52] U.S. Cl. ...................................... 251/30; 251/45
[58] Field of Search ............................. 251/45, 46, 30

[56] References Cited
U.S. PATENT DOCUMENTS

| | | | |
|---|---|---|---|
| 2,738,157 | 3/1956 | Vargo | 251/45 X |
| 2,882,929 | 4/1959 | Churchill et al. | 251/30 X |
| 3,306,570 | 2/1967 | Cooksley | 251/130 X |
| 3,368,582 | 2/1968 | Kozel et al. | 251/30 X |
| 3,768,771 | 10/1973 | Dicken, Jr. | 251/45 X |

Primary Examiner—Arnold Rosenthal

[57] ABSTRACT

A diaphragm controlled solenoid valve is disclosed having a small pressure inlet orifice in the diaphragm and is characterized by an internal groove provided in the bonnet with at least a portion of the groove being in the same vertical plane as the orifice. The groove is at least as wide and preferably is of greater width than the diameter of the orifice. A manually operable cam is provided for lifting the actuator of the solenoid in case of its malfunction. The spring which normally actuates the diaphragm is eliminated.

6 Claims, 2 Drawing Figures

SOLENOID-CONTROLLED DIAPHRAGM VALVES

BACKGROUND OF THE INVENTION

1. Field of the Invention

The present invention is related broadly to valves and more particularly concerns diaphragm controlled valves which are generally two-way or three-way valves and are remote-controlled by means of a solenoid.

2. Description of the Prior Art

In the diaphragm used as the operating member in this kind of valve, an orifice is generally provided to permit flow to the control chamber, which is above the diaphragm. This orifice is provided so that the pressure on both sides of the diaphragm is maintained. It often happens that this orifice becomes clogged with dirt so that no liquid can flow from one side of the diaphragm to the other. The pressure above the diaphragm then approches zero, while the flow pressure will tend to press the diaphragm against the wall of the bonnet until it applies itself against it and is fully supported thereby. This causes the orifice to contract even further so that the valve ceases to function.

Furthermore, all valves of this kind are provided with a bleed fitting in case the solenoid becomes damaged and will no longer operate to lower the pressure in the control chamber, i.e. above the diaphragm. If this happens the bleed fitting must be removed so that liquid can drip out therethrough. This may cause corrosion and also causes a flooding of the area around said valve, besides causing water losses.

This spring which acts against the flow pressure of the water causes pressure losses, and its use is, therefore, disadvantageous. However, no substitute therefor has been found so far.

SUMMARY OF THE INVENTION

It is the object of the present invention to provide a diaphragm-controlled valve which overcomes the abovementioned disadvantages and which will function efficiently even when dirt clogs the orifice or when the operation of the solenoid is impaired.

This invention comprises a diaphragm-controlled solenoid valve having a small pressure inlet orifice in the diaphragm, characterized in that an internal groove is provided in the bonnet in the same vertical plane as the said orifice, the groove being at least as wide and preferably of greater width than the diameter of the orifice.

In a preferred embodiment of the invention, a manually-operable cam is provided for lifting the actuator of the solenoid in case of its malfunction.

In still a further preferred embodiment the spring acting on the diaphragm is eliminated since the latter is constructed so that it follows the movement of the flow pressure.

BRIEF DESCRIPTION OF THE DRAWING

The invention is illustrated by way of example only in the accompanying drawing in which.

DESCRIPTION OF THE PREFERRED EMBODIMENT

Figure 1:
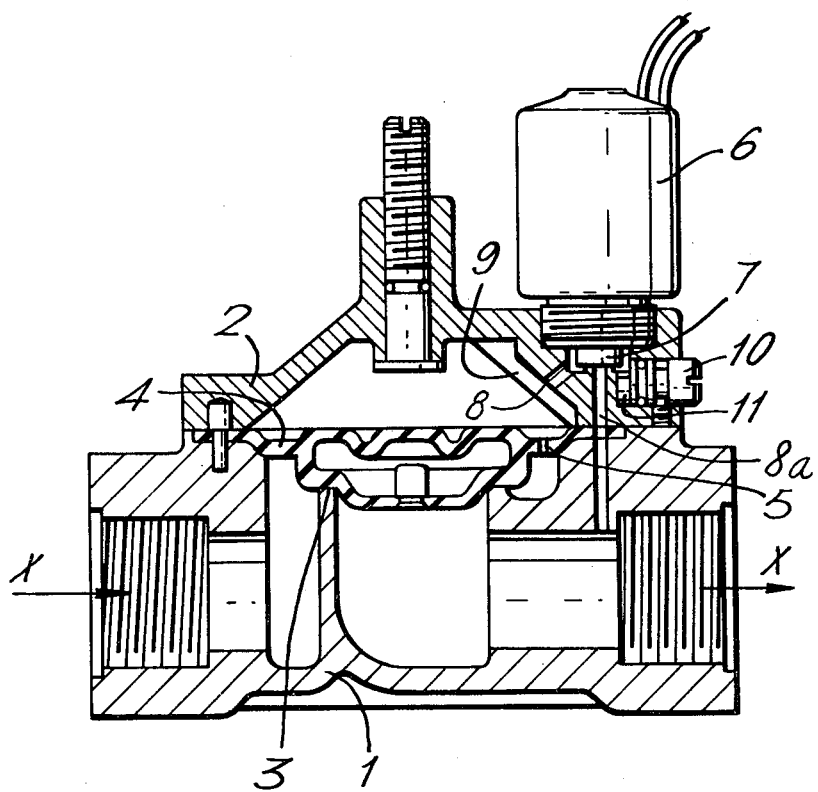
FIG. 1 is a vertical sectional view of the valve comprising the present invention.
Figure 2:
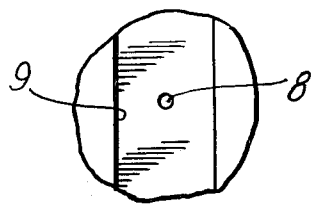
FIG. 2 is a fragmentary schematic plan view illustrating the relationship of two components shown in FIG. 1.

The valve here illustrated comprises a body 1, a bonnet 2, a valve seat 3 that is adapted to be closed by a diaphragm 4 having a pressure inlet orifice 5, a solenoid 6 with a plunger 7, a passage 8a leading from the solenoid 6 to a downstream portion of the valve, and a passage 8 to the control chamber, all as known, per se.

According to the invention a groove 9 is provided on the internal surface of the bonnet 2. At least a portion of the groove 9 is in the same vertical plane as orifice 5.

The width of the groove 9 is at least as wide and preferably is larger than the diameter of the orifice 5. Thus, if the orifice 5 becomes clogged with dirt and the pressure of the flow, which flows in the direction of arrow X, urges the diaphragm 4 against the wall of the bonnet, the pressure of the flow expands the wall of the diaphragm which, because there is no support for the diaphragm around the orifice 5 since it lies in the groove 9 whereby the dirt in the orifice 5 will be washed out.

In case the solenoid 6 malfunctions so that the plunger 7 will automatically be lowered and close the passage 8, the pressure in the bonnet 2 will act on the diaphragm 4 and permanently close it. In the known valves a bleeder fitting had to be opened in order to open the bonnet 2 to the atmosphere so that the diaphragm 4 would be removed from its seat.

According to the present invention, instead of the known bleed fitting, a set screw 10 having a cam 11 at its inner end is provided in the wall of the bonnet 2, the cam 11 being in contact with the plunger 7. Thus, when the solenoid 6 is damaged, a manual turning of the set screw 10 will cause the cam 11 to lift the plunger 7, so that the passage 8 is again open and the valve can operate.

It can be seen that the valve according to the present invention does not contain a spring. This has been eliminated according to the present invention because the elasticity of the diaphragm 4 is such that, owing to the upstream flow pressure, the diaphragm 4 will be pushed onto its seat when required and no spring is necessary.

What is claimed is:

1. In a diaphragm controlled solenoid valve having housing means defined, in part, by a bonnet including an internal conical wall surface, an elastic diaphragm supported along its periphery between the bonnet and the housing in opposition to the conical wall surface in the bonnet, the diaphragm being adapted to follow the movement of the flow pressure whereby a spring is not required to urge the diaphragm onto the conical wall surface and a small pressure inlet orifice in the diaphragm, the improvement comprising an internal groove elongated uprightly inclined in the internal conical wall surface of the bonnet, at least a portion of said groove being in the same vertical plane as and aligned with the orifice, said groove being at least as wide as the diameter of the orifice so that when the valve is open the diaphragm is supported by the conical wall surface in the bonnet with no support along the portion of the diaphragm that contains the orifice and which overlays said groove whereby the portion of the diaphragm that contains the orifice is stretched and the orifice is stretched and the orifice is enlarged to thereby permit contaminants that are lodged in the orifice to be washed away by the fluid flowing through the valve.

2. The valve as claimed in claim 1 wherein said groove is of greater width than the diameter of the orifice.

3. The valve as claimed in claim 1 wherein the entire groove is in the same plane as the orifice.

4. The valve as claimed in claim 1 wherein there is further provided means in the valve housing for manually lifting the actuator of a solenoid attached to the body of the valve in the event of a malfunction thereof.

5. The valve as claimed in claim 4 wherein said lifting means comprises a manually operable cam.

6. The valve as claimed in claim 5 wherein a screw is provided in said valve, a first end of said screw supporting said cam proximate the actuator of the solenoid, a second end of said screw being external of said valve and rotatable whereby said cam is also rotated to thereby displace the actuator of the solenoid.

* * * * *